US012746807B2

(12) United States Patent
An et al.

(10) Patent No.: US 12,746,807 B2
(45) Date of Patent: Sep. 29, 2026

(54) THROUGH MOUNT FIXED TYPE BATTERY APPARATUS AND ELECTRIC VEHICLE THEREOF

(71) Applicants: Hyundai Motor Company, Seoul (KR); Kia Corporation, Seoul (KR)

(72) Inventors: Kwang-Hee An, Bucheon-si (KR); Deok-Hwa Hong, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 917 days.

(21) Appl. No.: 17/994,859

(22) Filed: Nov. 28, 2022

(65) Prior Publication Data

US 2023/0406085 A1 Dec. 21, 2023

(30) Foreign Application Priority Data

Jun. 20, 2022 (KR) ........................ 10-2022-0074961

(51) Int. Cl.
*B60K 1/04* (2019.01)
*H01M 50/249* (2021.01)

(52) U.S. Cl.
CPC ............. *B60K 1/04* (2013.01); *H01M 50/249* (2021.01)

(58) Field of Classification Search
CPC ............. B60K 1/04; B60K 2001/0438; H01M 50/249; H01M 50/20
See application file for complete search history.

(56) References Cited

U.S. PATENT DOCUMENTS

| | | | | |
|---|---|---|---|---|
| 11,563,252 | B2 * | 1/2023 | Masaryk | |
| 11,766,926 | B2 * | 9/2023 | Ma | H01M 50/233 180/68.5 |
| 2020/0193291 | A1 | 6/2020 | Lee et al. | |
| 2022/0227214 | A1 * | 7/2022 | Yaita | B60K 1/04 |

FOREIGN PATENT DOCUMENTS

| | | | | |
|---|---|---|---|---|
| GB | 2480519 A | * 11/2011 | | B60G 7/001 |
| KR | 20190080578 A | 7/2019 | | |
| KR | 20210144378 A | * 11/2021 | | B60K 1/04 |

OTHER PUBLICATIONS

Text version of Mildner GB-2480519-A (Year: 2011).*
Translation of KR 20210144378 A relied upon in the office action. (Year: 2021).*

* cited by examiner

*Primary Examiner* — James A Shriver, II
*Assistant Examiner* — Nicholas R. Kandas
(74) *Attorney, Agent, or Firm* — Fish & Richardson P.C.

(57) ABSTRACT

An electric vehicle includes a floor panel, a seat cross member positioned at the floor panel, the seat cross member including an upper bracket and a lower bracket that define an internal structure therebetween, and a battery apparatus. The battery apparatus includes a battery module disposed below the floor panel, and a through mount member that is coupled to a through mounting position of the battery module and passes through the internal structure of the seat cross member. The through mount member is coupled to the seat cross member by any one of $CO_2$ welding-coupling, metal inert gas (MIG) welding-coupling, or an axial force coupling to thereby fix the battery module to the floor panel.

10 Claims, 3 Drawing Sheets

<CROSS-SECTIONAL VIEW OF THROUGH MOUNTING STRUCTURE(X) >

<CROSS-SECTIONAL VIEW OF THROUGH MOUNTING STRUCTURE(X) >

<CROSS SECTION A-A>

<CROSS SECTION B-B>

"L" CROSS-SECTIONAL COUPLING STRUCTURE

"T" CROSS-SECTIONAL COUPLING STRUCTURE

THROUGH MOUNT FIXED TYPE BATTERY APPARATUS AND ELECTRIC VEHICLE THEREOF

CROSS-REFERENCE TO RELATED APPLICATION

This application claims priority to Korean Patent Application No. 10-2022-0074961, filed on Jun. 20, 2022, which is incorporated herein by reference in its entirety.

TECHNICAL FIELD

The present disclosure relates to a battery apparatus, and particularly, to an electric vehicle to which a battery apparatus for securely fixing a battery module to a seat cross member with a through mount structure is applied.

BACKGROUND

In general, electric vehicles use a high-voltage battery with increased capacity in order to increase a driving distance to 200 miles or more, and is mounted with the high-voltage battery with increased size due to the increased capacity using a lower surface (or upper surface) of a floor panel of an underbody of a vehicle body.

To this end, a battery mounting structure includes a battery module, a battery mounting hardware, a floor panel, a seat cross member, and has a method in which the battery mounting hardware protruding from an upper surface of the battery module is positioned within a cross section of the seat cross member mounted on an upper surface of the floor panel, so that the battery module is fixedly coupled to the seat cross member in a state of being positioned under the floor panel.

In particular, the battery mounting structure uniformly forms a fixed position with respect to the battery module by applying a plurality of battery mounting hardware.

However, the battery mounting structure has a method in which a reinforcement member or a reinforcement panel may be provided because the battery mounting hardware is coupled only to a lower end of the member in a state of being introduced into the cross-section of the seat cross member.

In other words, in the battery mounting structure, the reinforcement member or the reinforcement panel should be added to a central surface of the floor panel while the battery mounting hardware is coupled to the seat cross member.

As described above, in the above-described conventional battery mounting structure, it is necessary to supplement the lack of rigidity due to the coupling between the battery mounting hardware and the member lower end of the seat cross member using the reinforcement member or the reinforcement panel.

The contents described in Description of Related Art are to help the understanding of the background of the present disclosure, and may include what is not previously known to those skilled in the art to which the present disclosure pertains.

SUMMARY OF THE DISCLOSURE

Accordingly, an object of the present disclosure in consideration of the above points is to provide a through mount fixed type battery apparatus, which may improve a riding comfort to a level greater than or equal to that of a conventional internal combustion engine vehicle as well as increasing rigidity through a robust structure to which a reinforcement member or a reinforcement panel is not applied by applying the through mount structure for coupling a battery module and a seat cross member to form a robust coupling state under the floor panel, and in particular, forming upper/lower coupling portions at positions of upper/lower ends of a cross section of the seat cross member in a state of passing through the battery module, and an electric vehicle thereof.

In order to achieve the object, a battery apparatus comprises: a battery module; a battery through fixing part configured to position the battery module under a floor panel; and a member double fixing part configured to form a fixing force of the battery module through a cross section internal structure of a seat cross member and any one of a $CO_2$ welding-coupling, a MIG welding-coupling, and an axial force coupling above the floor panel.

In some implementations, the battery through fixing part includes a mounting bolt configured to pass through the battery module, the floor panel, and the seat cross member, and a battery through hardware through which the mounting bolt passes, and which is fitted into a battery through hole of the battery module to come into contact with a lower surface of the floor panel.

In some implementations, the battery through hardware forms a battery mounting interval of the battery module with respect to the floor panel in the state of coming into contact with the lower surface of the floor panel.

In some implementations, the member double fixing part includes a mounting bolt configured to pass through the battery module, the floor panel, and the seat cross member, a battery through mounting bracket positioned between the floor panel and the seat cross member, and fixed to each of an upper surface of the floor panel and a lower surface of the seat cross member with a bent structure, a battery mounting hardware fixed to the mounting bolt inside a cross section of the seat cross member, and an upper member fixed to the battery mounting hardware on an upper surface of the seat cross member, and the battery mounting hardware is fixed to the upper member by the $CO_2$ welding-coupling.

In some implementations, the battery mounting hardware is formed in a hollow structure, and screw-fastened to the mounting bolt inside the hollow.

In some implementations, the upper member is coupled to the upper surface of the seat cross member by blind rivets.

In some implementations, the member double fixing part includes a mounting bolt configured to pass through the battery module, the floor panel, and the seat cross member, a battery through mounting bracket positioned between the floor panel and the seat cross member, and fixed to each of an upper surface of the floor panel and a lower surface of the seat cross member with a bent structure, and an aluminum hardware fixed to the mounting bolt inside a cross section of the seat cross member, and the aluminum hardware is fixed to the seat cross member made of aluminum by the MIG welding-coupling.

In some implementations, the aluminum hardware is formed in a hollow structure, and screw-fastened to the mounting bolt inside the hollow.

In some implementations, the member double fixing part includes a mounting bolt configured to pass through the battery module, the floor panel, and the seat cross member, a battery through mounting bracket positioned between the floor panel and the seat cross member, and fixed to each of an upper surface of the floor panel and a lower surface of the seat cross member with a bent structure, and a blind nut fixed to the mounting bolt inside a cross section of the seat cross member, and the blind nut is fixed by the axial force coupling through the screw-coupling with the mounting bolt.

In some implementations, the battery through fixing part and the member double fixing part are configured as a through mount member, and a plurality of through mount members are applied to form a robust fastening state of the battery module.

In addition, in order to achieve the object, an electric vehicle comprises: a floor panel; a seat cross member positioned above the floor panel, and having a cross section internal structure with an upper bracket and a lower bracket; and a battery apparatus in which a partial portion of the through mount member assembled to a through mounting position of a battery module positioned under the floor panel is positioned at a cross section internal structure of the seat cross member through the floor panel, and coupled to the cross section internal structure by any one of the $CO_2$ welding-coupling (A), the MIG welding-coupling (B), and the axial force coupling (C) to fix the battery module.

In some implementations, a plurality of through mounting positions are formed to match the number of seat cross members, the seat cross member includes a first seat cross member, a second seat cross member, and a third seat cross member, the first seat cross member has a cross-sectional internal structure in which the partial portion of the through mount member is positioned formed in an "L" cross-sectional coupling structure, and each of the second seat cross member and the third seat cross member has cross-sectional internal structures in which the partial portion of the through mount member is positioned formed in a "T" cross-sectional coupling structure.

In some implementations, the through mounting position is further formed to match a position of a rear cross member provided behind the seat cross member, and the rear cross member is coupled to an upper surface of the floor panel.

The through mount fixed type battery apparatus applied to the electric vehicle implements the following operations and effects.

First, the through mount structure can be coupled to the member cross section of the seat cross member by the upper/lower coupling portions in the state of passing through the battery module, thereby implementing the robust structure suitable for increasing the rigidity. Second, through the robust battery coupling structure, it is possible to reduce the weight and cost of the battery apparatus because the addition of the member for responding to the bending rigidity or the application of the reinforcement material, the reinforcement member/panel, or the like is unnecessary. Third, it is possible to increase the all electric range (AER), which is a traveling distance upon a single charge, by suppressing the increase in the weight through the minimization of the reinforcement weight. Fourth, the robust battery coupling structure can robustly couple the vehicle body structure and the battery frame structure (in particular, high-voltage battery) like one system, so that it is possible to minimize the space for applying the vehicle body structure having the insufficient space due to the increase in the interior merchantability and improve the interior merchantability. Fifth, through the robust battery coupling structure, it is possible to improve the riding comfort to the level greater than or equal to the conventional internal combustion engine vehicle with improved noise, vibration, harshness (NVH) performance as well as improving the bending rigidity (i.e., static/dynamic rigidities of the vehicle body) that is a problem of the conventional electric vehicle by increasing the connectivity between the vehicle body floor structure and the high-voltage battery structure.

DETAILED DESCRIPTION

Hereinafter, one or more examples of the present disclosure will be described in detail with reference to the accompanying exemplary drawings, and these examples are illustrative and may be implemented in various different forms by those skilled in the art to which the present disclosure pertains, and thus is not limited to the examples described herein.

Figure 1:
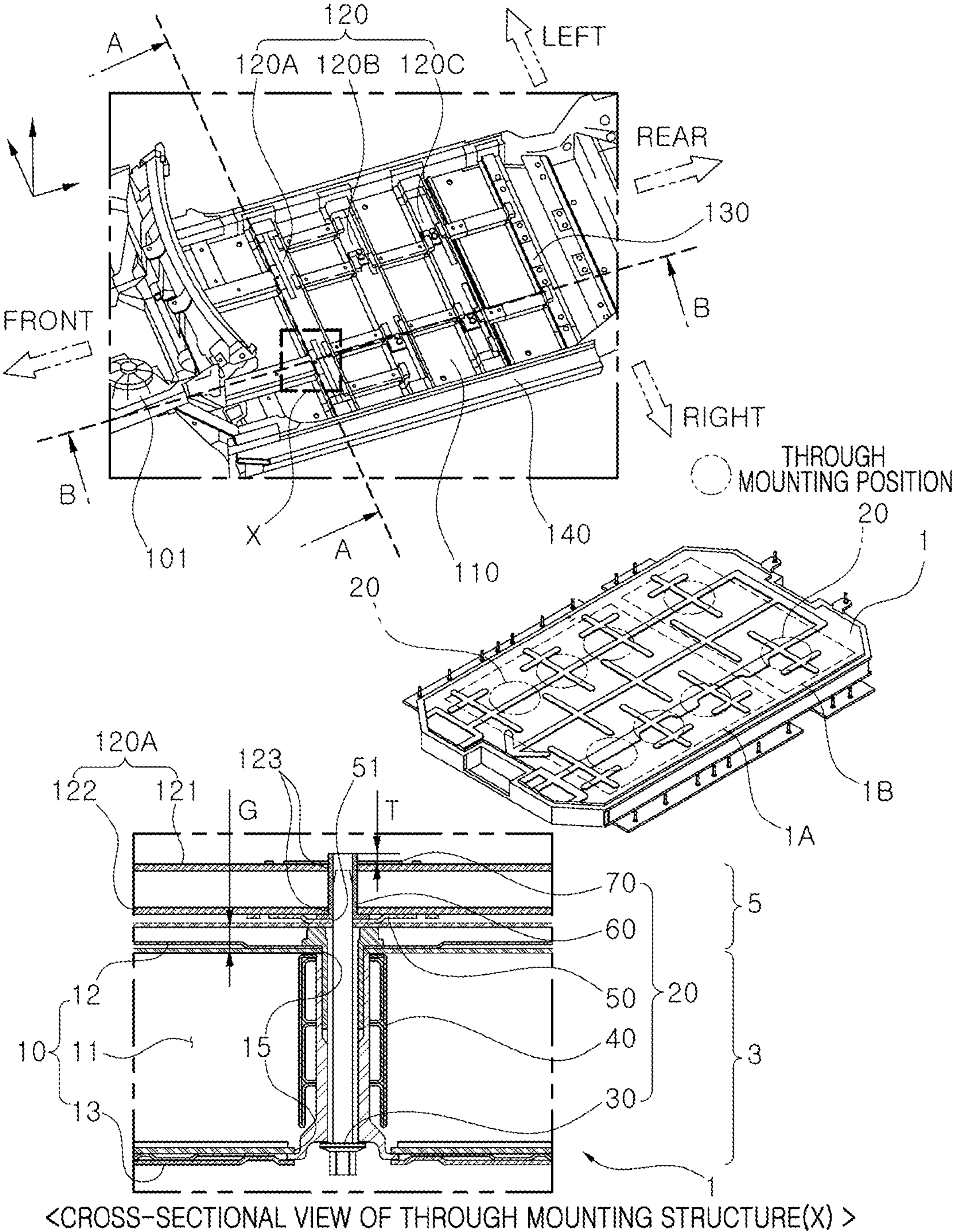
FIG. 1 is a configuration diagram of an example of a through mount fixed type battery apparatus applied to an electric vehicle.

Referring to FIG. 1, in some implementations, a battery apparatus 1 includes a battery module 10 positioned under a floor panel 110 coupled to a vehicle body platform 101 of an electric vehicle 100, and a through mount member 20 coupled to a seat cross member 120 positioned above the floor panel 110 by passing through the battery module 10.

In particular, the through mount member 20 includes a battery through fixing part 3 passing through the battery module 10 in a state of supporting a lower portion of the battery module 10, and a member double fixing part 5 fixed to upper/lower coupling portions of a member cross section in a state of passing through the cross section of the seat cross member 120.

Accordingly, the battery apparatus 1 may form a robust structure of the upper/lower coupling portions in which a mounting bolt 30 of the through mount member 20 included in the seat cross member 120 is used at a lower end and an upper end within the cross section of the cross member.

Accordingly, the battery apparatus 1 is characterized by a structure of compensating for an insufficient space caused by applying the vehicle body structure due to an increase in interior merchantability compared to the conventional battery through mount structure for an electric vehicle using another system (i.e., high-voltage battery) by robustly coupling the vehicle body structure and the battery (i.e., a frame structure of the high-voltage battery) like one system, and a structure having a level greater than or equal to that of the conventional internal combustion engine vehicle by not only improving the bending rigidities (i.e., static/dynamic rigidities) but also improving the riding comfort, which are problems of the conventional electric vehicle, through the robust coupling.

Specifically, the battery apparatus 1 includes the battery module 10 configured to generate power of the high-voltage battery and the through mount member 20 configured to position the battery module 10 under the floor panel 110 in a robustly fastened state, and the through mount member 20 includes the mounting bolt 30, a battery through hardware 40, a battery through mounting bracket 50, a battery mounting hardware 60, and an upper member 70. In this case, the battery through fixing part 3 includes the mounting bolt 30 and the battery through hardware 40, and the member double fixing part 5 includes the mounting bolt 30, the battery through mounting bracket 50, the battery mounting hardware 60, and the upper member 70.

For example, the battery module 10 includes a battery pack 11 including a plurality of cells or packs to generate power of the high-voltage battery, a battery upper case 12 configured to surround a top of the battery pack 11, and a battery lower case 13 configured to surround a bottom of the battery pack 11.

In particular, a battery through hole 15 forming an empty space in the battery pack 11 is formed in the battery upper case 12 and the battery lower case 13 so that the battery through hardware 40 is inserted, and the battery through hole 15 is formed at a through mounting position. In this case, the battery through holes 15 are formed in the same quantity according to the plurality of through mounting positions.

For example, the mounting bolt 30 includes a bolt head and a bolt shaft and passes through the battery through hole 15 from the bottom of the battery pack 11 and is positioned toward the seat cross member 120, the bolt head comes into contact with the battery through hardware 40 and is exposed to the bottom portion of the battery pack 11, and the bolt shaft is screw-coupled with a female screw formed on an inner circumferential surface of the battery mounting hardware 60 coupled to the seat cross member 120 and a male screw formed on an outer circumferential surface thereof, and thus forms a fixing force with the battery mounting hardware 60.

For example, the battery through hardware 40 is formed as a dual structure body having a shaft hole, and a diameter expansion portion of one end thereof comes into close contact with the battery lower case 13 over a periphery of the battery through hole 15 in a state of being fitted into the battery through hole 15, whereas a diameter contraction portion of the other end thereof exits the battery through hole 15 and comes into contact with the floor panel 110, so that a battery mounting interval G is formed between the battery upper case 12 and the floor panel 110.

In particular, the battery mounting interval G prevents the battery module 10 from coming into contact with the floor panel 110 even when the mounting bolt 30 receives an external impact in a state in which the mounting bolt 30 is fastened and fixed to the seat cross member 120.

For example, the battery through mounting bracket 50 forms a protrusion stepped portion 51 in which a bracket through hole is perforated so that the mounting bolt 30 passes through, and is positioned between the upper surface of the floor panel 110 and a lower surface of the seat cross member 120. In this case, the battery through mounting bracket 50 is formed in a bent structure having a "‘—_—’" cross-sectional structure through the protrusion stepped portion 51. In this case, the battery through mounting bracket 50 is made of steel.

In particular, the battery through mounting bracket 50 is welded and fixed to the floor panel 110 by the protrusion stepped portion 51, and a periphery of the bracket excluding the protrusion stepped portion 51 is bolt-fixed to the upper bracket 121 of the seat cross member 120 and the lower bracket 122 forming a cross-sectional structure. In this case, the welding and fixing may be performed by a $CO_2$ welding, and the bolt-fixing is performed by the coupling through a flow drill screw (FDS) that is a closed section coupling method.

For example, the battery mounting hardware 60 is fitted into the member through hole 123 perforated in the upper bracket 121 and the lower bracket 122 with a length longer than cross-sectional lengths of the upper bracket 121 and the lower bracket 122 of the seat cross member 120, and has an end protrusion exposed to the outside of the upper bracket 121, and thus passes through the upper member 70 positioned on the upper surface of the upper bracket 121. In this case, the battery mounting hardware 60 has a hollow pipe structure made of a steel material, and the seat cross member 120 is made of a carbon fiber reinforced plastic (CFRP).

In particular, the battery mounting hardware 60 is coupled to the upper member 70 by welding using the end protrusion. In this case, the end protrusion forms a protrusion end height T in the upper bracket 121, and the protrusion end height T easily forms an assembly position and a welding position of the upper member 70.

For example, the upper member 70 has a flat bracket shape and comes in close contact with the upper bracket 121 of the seat cross member 120, and the end protrusion of the battery mounting hardware 60 passes through the perforated hole.

In particular, the upper member 70 is fixed to the end protrusion of the battery mounting hardware 60 by welding using a periphery of the hole, and a periphery of the bracket excluding the hole is coupled to the upper bracket 121 of the seat cross member 120 through blind rivets.

As described above, the through mount member 20 applies the screw-coupling between the mounting bolt 30 and the battery mounting hardware 60, the welding between the battery through mounting bracket 50 and the floor panel 110, the FDS coupling between the battery through mounting bracket 50 and the seat cross member 120 (i.e., the lower bracket 122), the welding between the battery mounting hardware 60 and the upper member 70, the blind rivet coupling between the upper member 70 and the seat cross member 120 (i.e., the upper bracket 121), and the like.

Figure 2:
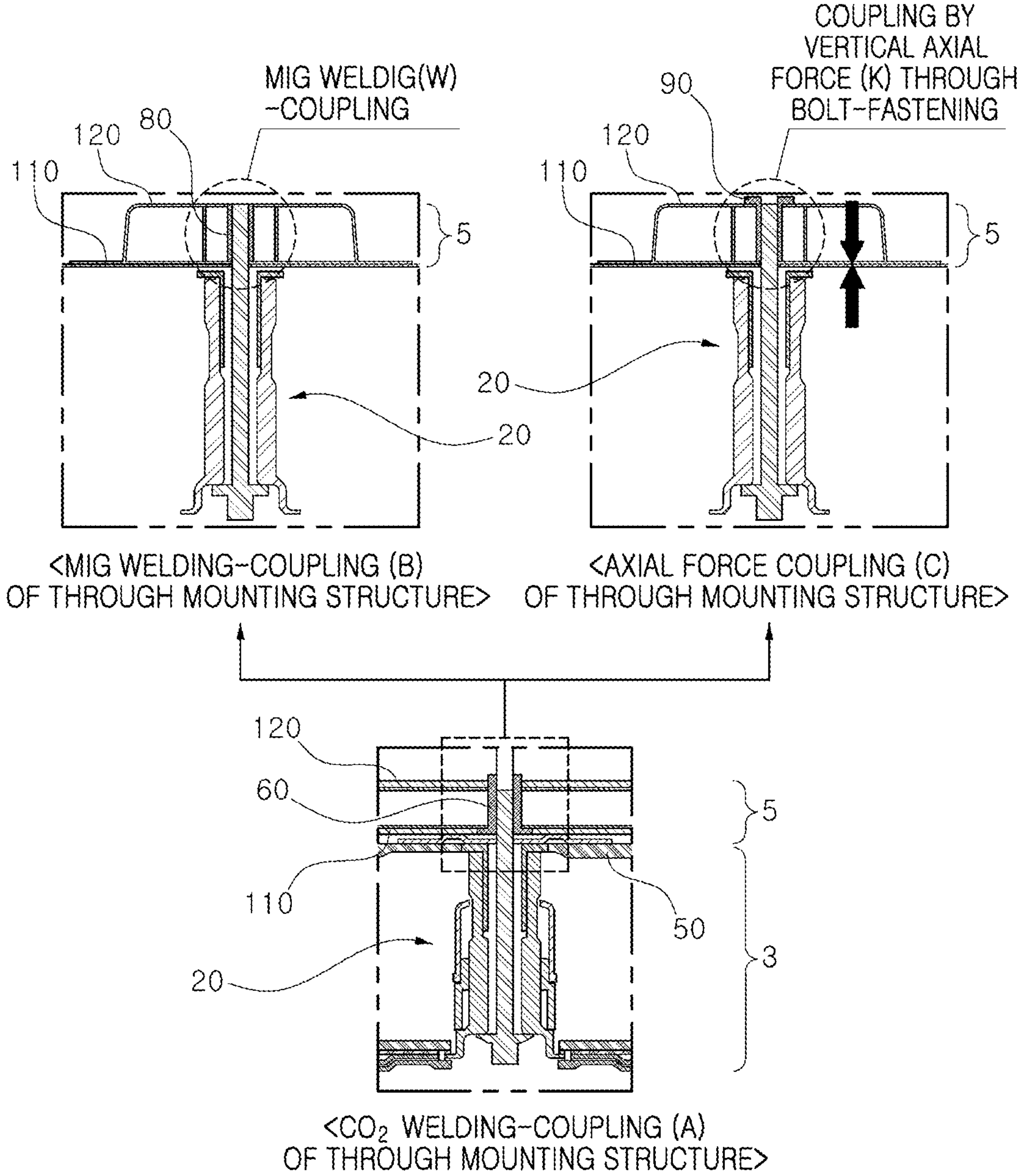
FIG. 2 shows an example of a member double fixing part applied to the through mount fixed type battery apparatus.

Accordingly, the member double fixing part 5 of the through mount member 20 is characterized by a $CO_2$ welding-coupling (A) (see FIG. 2).

In addition, FIG. 2 shows that the $CO_2$ welding-coupling (A) applied to the member double fixing part 5 is transformed into a metal inert gas (MIG) welding-coupling (B) or an axial force coupling (C).

For example, in a structure of the MIG welding-coupling (B), the battery mounting hardware 60 made of a steel material is replaced with a hollow aluminum hardware 80 made of an aluminum (Al) material, and the aluminum hardware 80 has a structure that is formed in the same length as the cross-sectional lengths of the upper bracket 121 and the lower bracket 122 of the seat cross member 120, so that the protrusion end height T of the battery mounting hardware 60 is not formed.

In particular, the aluminum hardware 80 is fitted into the member through holes 123 perforated in the upper bracket 121 and the lower bracket 122 and coupled to the seat cross member 120 and the seat cross member 120 is made of aluminum (Al) material like the aluminum hardware 80, so that the MIG welding W is applied.

Accordingly, in the structure of the MIG welding-coupling (B), the mounting bolt 30 is screw-coupled with the aluminum hardware 80 without the application of the upper member 70.

For example, the structure of the axial force coupling (C) is formed in a structure in which the battery mounting hardware 60 is replaced with a hollow blind nut 90 having a female screw formed on the inner circumferential surface, and the blind nut 90 has a nut flange formed at one end, so that the protrusion end height T of the battery mounting hardware 60 is not formed.

In particular, the blind nut 90 is inserted into the lower bracket 122 from the upper bracket 121 through the member through hole 123 and coupled to the seat cross member 120, and the blind nut 90 is bolt-fastened to the mounting bolt 30 in a process that is coupled to the seat cross member 120, so that the mounting bolt 30 and the blind nut 90 form a bolt-fixed force at a generated vertical axial force (K).

Accordingly, in the structure of the axial force coupling (C), the mounting bolt 30 is screw-coupled with the blind nut 90 without the application of the upper member 70.

Figure 3:
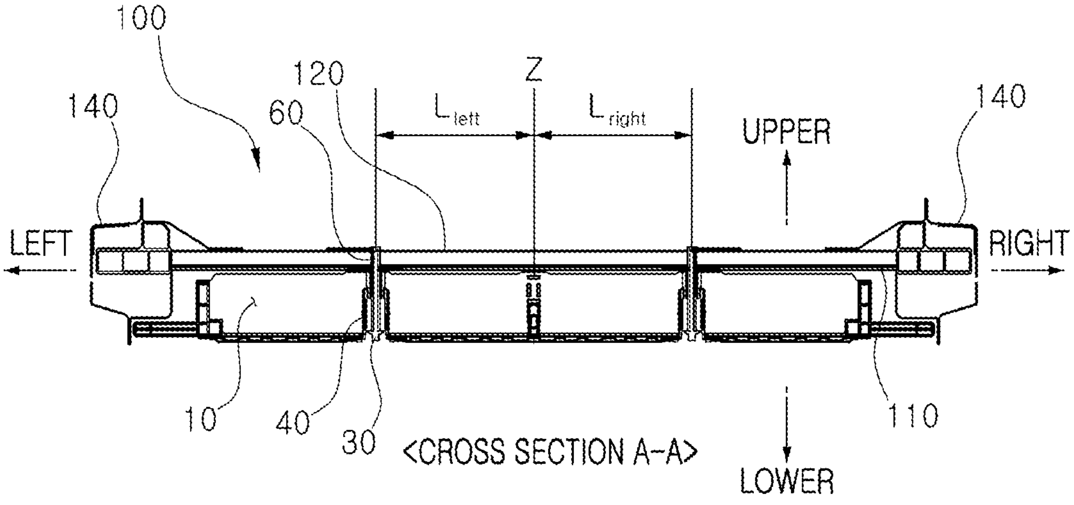
FIG. 3 is a cross-sectional view taken along line A-A of the through mount fixed type battery apparatus.
Figure 4:
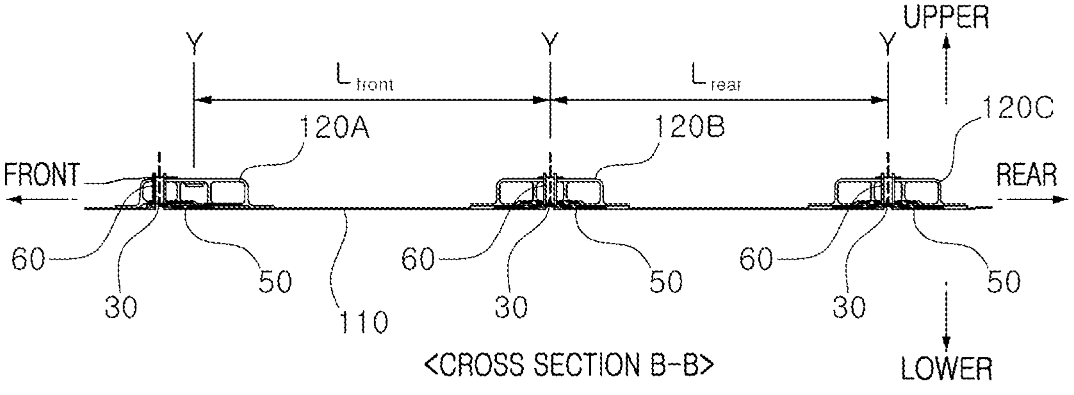
FIG. 4 is a cross-sectional view taken along line B-B of the through mount fixed type battery apparatus.

FIGS. 1, 3, and 4 show an example in which the battery apparatus 1 has a plurality of through mounting positions, and the through mount member 20 is applied to each of the through mounting positions.

Referring to FIG. 1, the through mounting positions are classified into a first through mounting group TA and a second through mounting group 1B.

For example, the first through mounting group TA is connected to first, second, and third seat cross members 120A, 120B, and 120C configuring the seat cross member 120, so that the first through mounting group TA includes a first column formed at two left and right positions of the first seat cross member 120A at intervals, a second column formed at two left and right positions of the second seat cross member 120B at intervals, and a third column formed at two left and right positions of the third seat cross member 120C at intervals. On the other hand, the second through mounting group 1B is connected to the rear cross member 130 positioned at the rear side (i.e., a rear seat position portion) of the floor panel 110, and thus includes a fourth column formed at two left and right positions of the rear cross member 130 at intervals.

Accordingly, the through mounting positions include a total of four first, second, third, and fourth columns, so that the battery module 10 can maintain the assembled state with uniform fastening and fixing force. In this case, the through mounting position may be freely configured at the front/middle/rear positions with respect to the multi-section of the seat cross member 120.

Referring to a cross section taken along line A-A in FIG. 3, the first and second through mounting groups 1A and 1B of the battery module 10, which is fastened to the seat cross member 120 through the first and second through mounting groups 1A and 1B under the floor panel 110, symmetrically form the two left/right positions of the first, second, third, and fourth columns. In this case, side sills 140 are provided at the left and right sides of the floor panel 110, and the side sill 140 strengthens the rigidities at the left and right sides of the vehicle body platform 101.

In other words, the two left/right positions of the first, second, third, and fourth columns configuring the first and second through mounting groups TA and TB are classified into a left mounting interval $L_{left}$ and a right mounting interval $L_{right}$ with respect to left/right middle positions Z of the battery module 10 (or the floor panel 110), and the left/right mounting intervals $L_{left}/L_{right}$ are identically formed. However, the left/right mounting intervals ($L_{left}/L_{right}$) may have different intervals to strengthen the battery fixing force or balance the overall weight of the system.

Referring to a cross section taken along line B-B in FIG. 4, the columns and column positions of the first, second, third, and fourth columns configuring the first and second through mounting groups 1A and 1B are classified into a front mounting gap $L_{front}$ and a rear mounting gap $L_{rear}$ with respect to the member cross section middle position Y of the seat cross member 120, and the front/rear mounting gaps $L_{front}/L_{rear}$ are identically formed. However, the front/rear mounting intervals $L_{front}/L_{rear}$ may be different in order to strengthen the battery fixing force or balance the overall weight of the system.

In particular, the member double fixing part 5 of the first through mounting group TA is classified into an "L" cross-sectional coupling structure or a "T" cross-sectional coupling structure (or "reverse T" cross-sectional coupling structure) depending on the member cross-sectional internal structure of the seat cross member 120, and the "L" cross-sectional coupling structure has the battery through mounting bracket formed to be spaced apart from the member cross-sectional middle position Y at a predetermined offset distance with respect to the battery mounting hardware 60, whereas the "T" cross-sectional coupling structure has the battery through mounting bracket 50 formed to match the member cross-sectional middle position Y with respect to the battery mounting hardware 60.

Accordingly, the first column of the first through mounting group TA forms the member double fixing part 5 of the "L" cross-sectional coupling structure due to the member cross-sectional internal structure of the first seat cross member 120A, whereas each of the second and third columns forms the member double fixing part 5 of the "T" cross-sectional coupling structure due to the member cross-sectional internal structure of the second seat cross member 120B and the third seat cross member 120C.

In addition, the fourth column of the second through mounting group 1B has not been shown, but may be formed as the member double fixing part 5 having the "L" cross-sectional coupling structure or "T" cross-sectional coupling structure to match the "L" cross-sectional coupling structure or "T" cross-sectional coupling structure of the rear cross member 130.

As described above, in the through mount fixed type battery apparatus 1 applied to the electric vehicle 100, a partial portion of the through mount member 20 assembled to the through mounting position of the battery module 10 positioned under the floor panel 110 is positioned at the cross section internal structure of the seat cross member 120 through the floor panel 110, and coupled to the cross section internal structure by any one of the $CO_2$ welding-coupling (A), the MIG welding-coupling (B), and the axial force coupling (C) to fix the battery module 10, and thus the robust coupling state of the battery module 10 may be formed under the floor panel 110, and in particular, the upper/lower coupling portions may be formed at the cross-sectional upper/lower end positions of the seat cross member 120 in the state of passing through the battery module 10, thereby not only increasing the rigidity through the robust structure in which the reinforcement member or the reinforcement panel is not applied, but also improving the riding comfort to the level greater than or equal to that of the conventional internal combustion engine vehicle.

What is claimed is:

1. A battery apparatus comprising:

a battery module;

a battery through fixing part configured to position the battery module under a floor panel of a vehicle; and a member double fixing part configured to be disposed above the floor panel and fix the battery to the floor panel by an internal structure of a seat cross member of the vehicle and by any one of $CO_2$ welding-coupling, metal inert gas (MIG) welding-coupling, or an axial force coupling, wherein the battery module comprises a battery upper case, a battery lower case, and a battery pack disposed between the battery upper case and the battery lower case, wherein the battery module defines a battery through hole at a through mounting position of the battery module, the battery through hole being an empty space expanding through the battery upper case, the battery pack, and the battery lower case, and wherein the battery through fixing part comprises a mounting bolt configured to pass through the battery module, the floor panel, and the seat cross member.

2. The battery apparatus of claim 1, wherein the battery through fixing part comprises:

a battery through hardware that is fitted into the battery through hole and receives the mounting bolt, the battery through hardware being configured to contact a lower surface of the floor panel.

3. The battery apparatus of claim 2, wherein the battery through hardware is configured to define a battery mounting interval between the battery module and the floor panel based on contacting the lower surface of the floor panel.

4. The battery apparatus of claim 1, wherein the member double fixing part is configured to receive at least a portion of the mounting bolt, wherein the member double fixing part comprises:

a battery through mounting bracket configured to be positioned between the floor panel and the seat cross member and fixed to each of an upper surface of the floor panel and a lower surface of the seat cross member, the battery through mounting bracket having a bent structure;

a battery mounting hardware fixed to the mounting bolt and configured to be disposed inside the seat cross member; and an upper member fixed to the battery mounting hardware and configured to be positioned on or above an upper surface of the seat cross member, and wherein the battery mounting hardware is fixed to the upper member by $CO_2$ welding-coupling.

5. The battery apparatus of claim 1, wherein the member double fixing part is configured to receive at least a portion of the mounting bolt, wherein the member double fixing part comprises:

a battery through mounting bracket configured to be positioned between the floor panel and the seat cross member and fixed to each of an upper surface of the floor panel and a lower surface of the seat cross member, the battery through mounting bracket having a bent structure; and an aluminum hardware fixed to the mounting bolt and configured to be disposed inside the seat cross member, the seat cross member being made of aluminum, and wherein the aluminum hardware is configured to be fixed to the seat cross member by MIG welding-coupling.

6. The battery apparatus of claim 5, wherein the aluminum hardware defines a hole that receives the mounting bolt therein, the mounting bolt being screw-fastened in the hole of the aluminum hardware.

7. The battery apparatus of claim 1, wherein the member double fixing part is configured to receive at least a portion of the mounting bolt, and wherein the member double fixing part comprises:

a battery through mounting bracket configured to be positioned between the floor panel and the seat cross member and fixed to each of an upper surface of the floor panel and a lower surface of the seat cross member, the battery through mounting bracket having a bent structure; and a blind nut fixed to the mounting bolt by screw-coupling, at least a portion of the blind nut being configured to be disposed inside the seat cross member.

8. The battery apparatus of claim 1, further comprising a plurality of through mount members configured to fasten the battery module to the floor panel, wherein the battery through fixing part and the member double fixing part defines one of the plurality of through mount members.

9. The battery apparatus of claim 1, wherein the battery upper case, the floor panel, and the seat cross member are disposed at an upper side of the battery pack, and wherein the battery lower case is disposed at a lower side of the battery pack opposite to the upper side.

10. The battery apparatus of claim 1, wherein the mounting bolt extends through the battery lower case, the battery pack, the battery upper case, the floor panel, and the seat cross member.

* * * * *